United States Patent
Steiner

Patent Number: 5,466,026
Date of Patent: Nov. 14, 1995

[54] TIRE LIFTER APPARATUS

[76] Inventor: Timothy L. Steiner, 125 Greenfield La., Bismark, N. Dak. 58501

[21] Appl. No.: 337,042

[22] Filed: Nov. 10, 1994

[51] Int. Cl.⁶ .................................................. B65G 7/08
[52] U.S. Cl. .................................. 294/17; 254/131
[58] Field of Search ................................. 294/4, 15–17, 294/26, 62, 92, 104; 254/113, 120, 131

[56] References Cited

U.S. PATENT DOCUMENTS

| | | | |
|---|---|---|---|
| 322,019 | 7/1885 | Spencer | 294/17 |
| 573,844 | 12/1896 | Ellis | 294/17 |
| 840,938 | 1/1907 | Heller et al. | 294/17 X |
| 951,200 | 3/1910 | Pilliner | 294/17 X |
| 1,514,478 | 11/1924 | Swain | 294/17 |
| 1,714,401 | 5/1929 | Sigsbee | 294/15 |
| 2,132,553 | 10/1938 | Andrejchak | 294/17 |
| 2,416,016 | 2/1947 | McKenna | 294/15 |
| 2,639,934 | 5/1953 | Swinamer | 294/15 |
| 3,059,954 | 10/1962 | Matejicek | 294/16 |
| 3,482,719 | 12/1969 | Sedgebeer . | |
| 3,517,959 | 6/1970 | Ferguson . | |
| 4,022,341 | 5/1977 | Lindquist . | |
| 4,123,038 | 10/1978 | Meyers . | |
| 4,136,903 | 1/1979 | Roethler . | |

FOREIGN PATENT DOCUMENTS

| | | | |
|---|---|---|---|
| 62177 | 6/1955 | France | 294/17 |

*Primary Examiner*—Johnny D. Cherry

[57] ABSTRACT

A tire lifter apparatus includes a lever member having a first lever arm portion and a second lever arm portion. The second lever arm portion lies contiguous to an apparatus plane. A fulcrum assembly is connected to the lever member such that the fulcrum assembly divides the lever member into the first lever arm portion and the second lever arm portion. The fulcrum assembly is contiguous to the apparatus plane. A clamp assembly is pivotally connected to the fulcrum assembly. The clamp assembly lies contiguous to the apparatus plane, and the clamp assembly is adapted to clamp onto a tire which is contiguous to a tire plane which is perpendicular to the apparatus plane. A stop member is connected to the first lever arm portion of the lever member adjacent to the fulcrum assembly. The stop member is contiguous to the apparatus plane. The clamp assembly includes a first clamp member which is connected to the fulcrum assembly and which is oriented substantially perpendicular to the lever member in the apparatus plane. A jaw member is connected at a perpendicular orientation to the first clamp member at a distal end of the first clamp member in the apparatus plane. The jaw member extends from the first clamp member in a direction toward the distal end of the lever member. The fulcrum assembly is connected to the lever member by a first connection, and the fulcrum assembly is connected to the clamp assembly by a second connection.

3 Claims, 2 Drawing Sheets

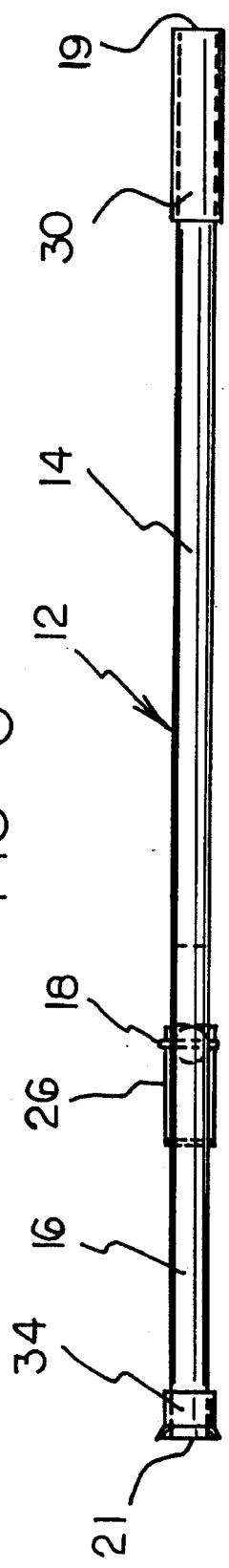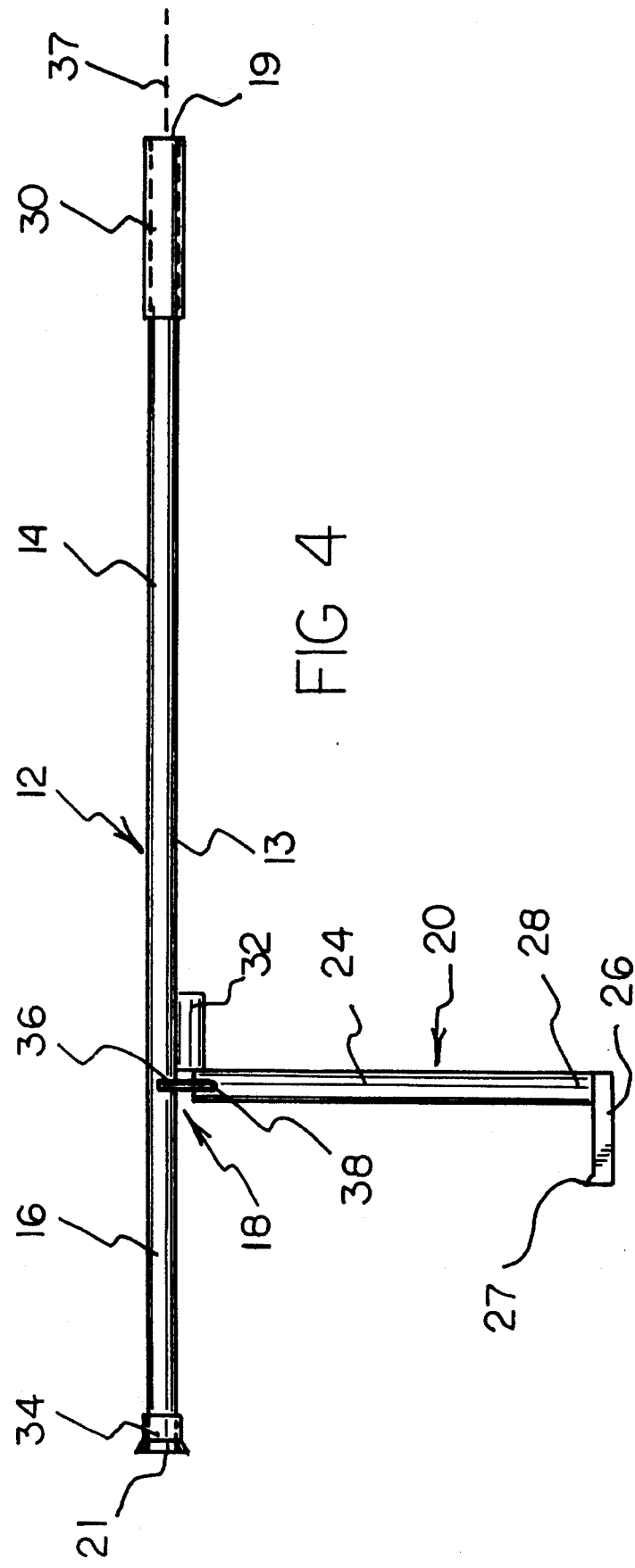

TIRE LIFTER APPARATUS

BACKGROUND OF THE INVENTION

1. Field of the Invention

The present invention relates generally to devices for lifting tires, and more particularly, to a device especially adapted for lifting a tire from a horizontal to a vertical position.

2. Description of the Prior Art

Handling large tires, whether mounted on wheels or unmounted, may put a lot of stress on a worker's back. This is especially true of large truck tires which may weigh in a range of 100 to 250 lbs. and which may range in sizes from 17.5 to 24.5 inches. Presently, a worker must bend over and lift the tire by hand.

Throughout the years, a number of innovations have been developed relating to lifting tires, and the following U.S. patents are representative of some of those innovations: U.S. Pat. Nos. 3,482,719; 3,517,959; 4,022,341; 4,123,038; and 4,136,903. More specifically, U.S. Pat. No. 3,482,719 discloses a mobile tire lifter which includes a seat structure on which a mechanic can remain seated as vehicle tires or wheel assemblies are quickly removed or replaced. The device is designed to move tires from one vertical position on or off a vehicle to another vertical position off or on the vehicle. The device is not designed to move a tire from a horizontal to a vertical orientation. In view of the above, it would be desirable if a tire lifter were provided that which is designed to lift a tire from a horizontal to a vertical orientation.

U.S. Pat. No. 3,517,959 discloses a wheel lifter that is designed to fit onto a vertically oriented wheel and lift it to a higher location. No provision is provided for lifting a tire from a horizontal to a vertical orientation.

U.S. Pat. No. 4,022,341 discloses a lifting device for tire-rim assemblies. The device is designed for moving a vehicle tire-rim assembly which may weigh several thousand pounds from a vertical orientation in one location to a vertical orientation in another location.

U.S. Pat. No. 4,123,038 discloses a wheel lift apparatus that includes four wheels and hydraulic cylinder lifting devices. Such a complex device is very bulky and heavy and cannot be readily hand carried from one location to another. For convenience, it would be desirable if a tire lifter could be readily hand-carried from one location to another. Also, it would be desirable to lift and move tires without the use of hydraulic cylinders.

U.S. Pat. No. 4,136,903 discloses a tire lifting apparatus that is designed for lifting tires in a horizontal orientation. The device moves the horizontally oriented tires from one location to another.

Still other features would be desirable in a tire lifter apparatus. The tire lifting apparatuses disclosed in the prior art discussed above are complex devices having many moving parts. For purposes of simplicity and economy, it would be desirable if a tire lifter apparatus had only two moving parts. Tires come in a variety of thicknesses. Therefore, it would be desirable for a tire lifter apparatus to be readily adjustable to tires of a range of different thicknesses. It would also be desirable for a tire lifter apparatus to automatically clamp onto a tire to be lifted.

The principle of leverage is often used to lift heavy weights. In this respect, it would be desirable if a hand-held, readily-carried tire lifter apparatus having two moving parts employs the principle of leverage for lifting tires from a horizontal to a vertical orientation.

Thus, while the foregoing body of prior art indicates it to be well known to use devices for lifting and moving tires from one location to another, the prior art described above does not teach or suggest a tire lifter apparatus which has the following combination of desirable features: (1) is designed to lift a tire from a horizontal to a vertical orientation; (2) can be readily hand-carried from one location to another; (3) can be used to lift and move tires without the use of hydraulic cylinders; (4) has only two moving parts; (5) is readily adjustable to different tires having different thicknesses; (6) automatically clamps onto a tire to be lifted; and (7) is a hand-held, readily-carried tire lifter apparatus having two moving parts which employs the principle of leverage for lifting tires from a horizontal to a vertical orientation. The foregoing desired characteristics are provided by the unique tire lifter apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a tire lifter apparatus which includes a lever member which includes a proximal end and a distal end. The lever member includes a first lever arm portion adjacent to the proximal end and a second lever arm portion adjacent to the distal end. The second lever arm portion lies contiguous to an apparatus plane. A fulcrum assembly is connected to the lever member such that the fulcrum assembly divides the lever member into the first lever arm portion and the second lever arm portion. The fulcrum assembly projects outward from a first side of the lever member. The fulcrum assembly is contiguous to the apparatus plane. A clamp assembly is pivotally connected to the fulcrum assembly. The clamp assembly lies contiguous to the apparatus plane, and the clamp assembly is adapted to clamp onto a tire which is contiguous to a tire plane. The tire plane is perpendicular to the apparatus plane.

A handle grip is connected to the first lever arm portion of the lever member. A protective cap is placed over the distal end of the lever member. The protective cap and the handle grip may be made of rubber. A stop member is connected to the first lever arm portion of the lever member adjacent to the fulcrum assembly. The stop member is contiguous to the apparatus plane.

The clamp assembly includes a first clamp member which is connected to the fulcrum assembly. The first clamp member is oriented substantially perpendicular to the lever member in the apparatus plane, and a jaw member is connected at a perpendicular orientation to the first clamp member at a distal end of the first clamp member in the apparatus plane. The jaw member extends from the first clamp member in a direction toward the distal end of the lever member. The jaw member includes a pointed end adapted to grip a tire.

The fulcrum assembly is connected to the lever member by a first connection, and the fulcrum assembly is connected to the clamp assembly by a second connection.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carded out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tire lifter apparatus which has all of the advantages of the prior art and none of the disadvantages.

It is another object of the present invention to provide a new and improved tire lifter apparatus which may be easily and efficiently manufactured and marketed.

It is a further object of the present invention to provide a new and improved tire lifter apparatus which is of durable and reliable construction.

An even further object of the present invention is to provide a new and improved tire lifter apparatus which is susceptible of a low cost of manufacture with regard to both materials and labor, and which accordingly is then susceptible of low prices of sale to the consuming public, thereby making such tire lifter apparatus available to the buying public.

Still yet a further object of the present invention is to provide a new and improved tire lifter apparatus which is designed to lift a tire from a horizontal to a vertical orientation.

Still another object of the present invention is to provide a new and improved tire lifter apparatus that can be readily hand-carried from one location to another.

Yet another object of the present invention is to provide a new and improved tire lifter apparatus which can be used to lift and move tires without the use of hydraulic cylinders.

Even another object of the present invention is to provide a new and improved tire lifter apparatus that has only two moving parts.

Still a further object of the present invention is to provide a new and improved tire lifter apparatus which is readily adjustable to different tires having different thicknesses.

Yet another object of the present invention is to provide a new and improved tire lifter apparatus that automatically clamps onto a tire to be lifted.

Still another object of the present invention is to provide a new and improved tire lifter apparatus which is a hand-held, readily-carried tire lifter apparatus having two moving parts which employs the principle of leverage for lifting tires from a horizontal to a vertical orientation.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an enlarged bottom view of the embodiment of the tire lifter apparatus of FIG. 1 without the tire being present.

FIG. 4 is a side view of the embodiment of the invention shown in FIG. 3.

DESCRIPTION OF THE PREFERRED EMBODIMENT

Figure 1:
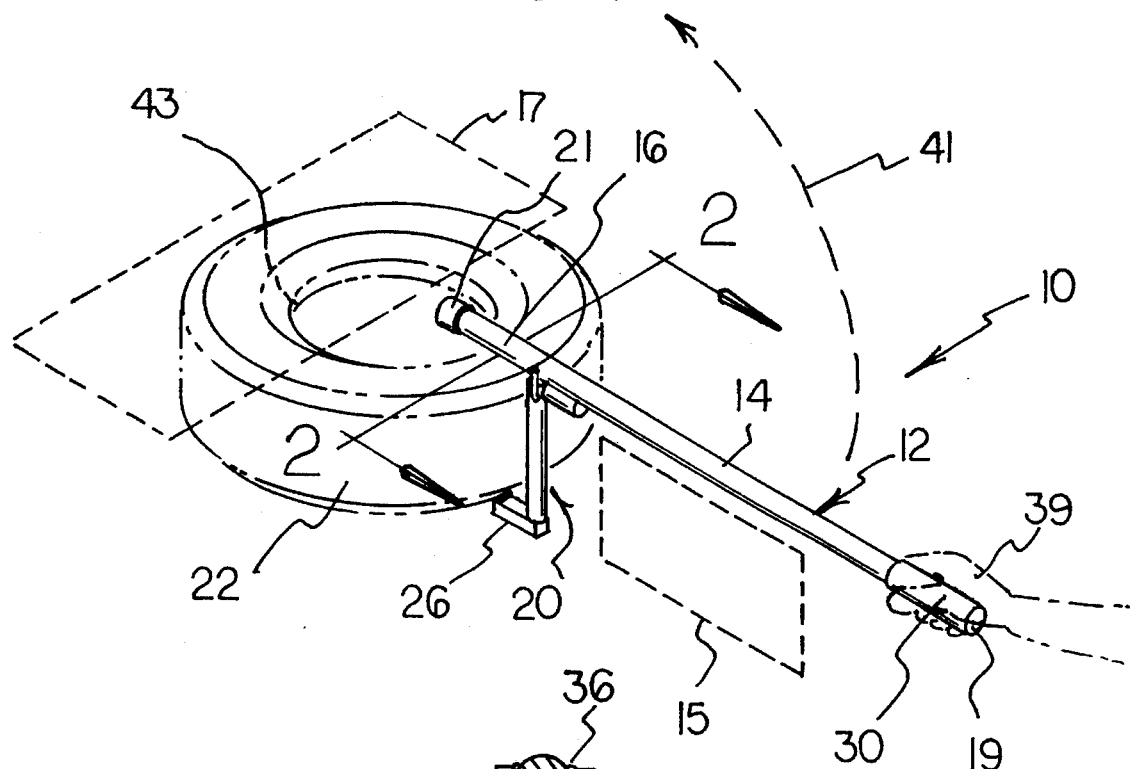
FIG. 1 is a perspective view showing a preferred embodiment of the tire lifter apparatus of the invention applied to a tire in a horizontal orientation.
Figure 2:
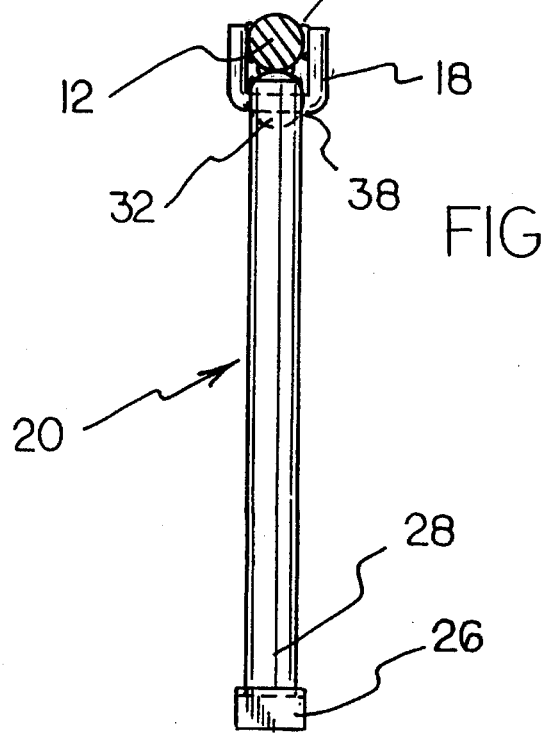
FIG. 2 is an enlarged cross-sectional view of the embodiment of the tire lifter apparatus shown in FIG. 1 taken along line 2—2 of FIG. 1 without the tire being present.

With reference to the drawings, a new and improved tire lifter apparatus embodying the principles and concepts of the present invention will be described.

Turning to FIGS. 1–4, there is shown an exemplary embodiment of the tire lifter apparatus of the invention generally designated by reference numeral 10. In its preferred form, tire lifter apparatus 10 includes a lever member 12 which includes a proximal end 19 and a distal end 21. The lever member 12 includes a first lever arm portion 14 adjacent to the proximal end 19 and a second lever arm portion 16 adjacent to the distal end 21. The second lever arm portion 16 lies contiguous to an apparatus plane 15. A fulcrum assembly 18 is connected to the lever member 12 such that the fulcrum assembly 18 divides the lever member 12 into the first lever arm portion 14 and the second lever arm portion 16. The fulcrum assembly 18 projects outward from a first side 13 of the lever member 12. The fulcrum assembly 18 is contiguous to the apparatus plane 15. A clamp assembly 20 is pivotally connected to the fulcrum assembly 18. The clamp assembly 20 lies contiguous to the apparatus plane 15, and the clamp assembly 20 is adapted to clamp onto a tire 22 which is contiguous to a tire plane 17. The tire plane 17 is perpendicular to the apparatus plane 15.

A handle grip 30 is connected to the first lever arm portion 14 of the lever member 12. A protective cap 34 is placed over the distal end 21 of the lever member 12. The protective cap 34 and the handle grip 30 may be made of rubber. A stop member 32 is connected to the first lever arm portion 14 of the lever member 12 adjacent to the fulcrum assembly 18. The stop member 32 is contiguous to the apparatus plane 15.

The clamp assembly 20 includes a first clamp member 24 which is connected to the fulcrum assembly 18. The first clamp member 24 is oriented substantially perpendicular to the lever member 12 in the apparatus plane 15, and a jaw member 26 is connected at a perpendicular orientation to the first clamp member 24 at a distal end 28 of the first clamp member 24 in the apparatus plane 15. The jaw member 26 extends from the first clamp member 24 in a direction toward the distal end 21 of the lever member 12. The jaw member 26 includes a pointed end 27 adapted to grip a tire 22.

The fulcrum assembly 18 is connected to the lever member 12 by a first connection 36, and the fulcrum assembly 18 is connected to the clamp assembly 20 by a second connection 38. The first connection 36 can be rigid or pivotal. The second connection 38 is a pivotal connection. As shown in greatest detail in FIGS. 2 and 4, the fulcrum assembly 18 is in the form of a U-shaped structure. Ends of the U-shaped structure are connected to the lever member 12 by a bolt (not shown) which fastens the ends of the U-shaped structure to the lever member 12. The bolt passes through connection apertures in the lever member 12.

The second connection 38 is pivotal. An intermediate portion of the U-shaped structure of the fulcrum assembly 18 passes through apertures at the proximal end of the first clamp member 24 of the clamp assembly 20. The clamp assembly 20 can swing around the fulcrum assembly 18.

The relative length of the first lever arm portion 14 of the lever member 12 with respect to the length of the second lever arm portion 16 of the lever member 12 determines the multiplier or leverage effect of the lever member 12 for lifting a tire 22. When the ratio of the length of the first lever arm portion 14 to the length of the second lever arm portion 16 is increased, the leverage effect is increased.

In using the tire lifter apparatus 10 of the invention, a tire 22 is in a horizontal orientation, as shown in FIG. 1, lying on a floor. The tire 22, in effect, lies contiguous to the horizontal tire plane 17. The tire lifter apparatus 10 is applied to the tire 22 with the tire lifter apparatus 10 oriented in a vertical orientation. That is, the tire lifter apparatus 10 is contiguous to the vertical apparatus plane 15. Of course the horizontal tire plane 17 and the vertical apparatus plane 15 are perpendicular to each other.

In applying the tire lifter apparatus 10 to the tire 22, the jaw member 26 of the clamp assembly 20 is slid under a circumferential edge region of the tire 22. With a person gripping the handle grip 30 of the lever member 12, a longitudinal force is applied along the longitudinal axis 37 of the lever member 12 in the direction of the tire 22 whereby the jaw member 26 moves under the edge of the tire 22, and whereby the first clamp member 24 of the clamp assembly 20 butts up against the tread portion of the tire 22. The stop member 32 maintains the first clamp member 24 in a substantially perpendicular orientation with respect to the lever member 12 as the tire lifter apparatus 10 of the invention is pushed onto the tire 22.

At the same time, the second lever arm portion 16 of the lever member 12 moves over a top portion of the tire 22. In this position, a circumferential portion of the tire 22 is located between the jaw member 26 of the clamp assembly 20 and the second lever arm portion 16 of the lever member 12.

To lift the tire 22 from the horizontal to a vertical orientation, with a person's hand 39 grasping the handle grip 30, the first lever arm portion 14 is pulled upward along an arc shown by curved broken line 41. During lifting of the first lever arm portion 14, a portion of the weight of the tire 22 is supported by the jaw member 26, and the second lever arm portion 16 of the lever member 12 serves to clamp the tire 22 between the second lever arm portion 16 and the jaw member 26. The clamp assembly 20 pivots around the second connection 38 between the fulcrum assembly 18 and the clamp assembly 20 as the tire 22 is clamped between the second lever arm portion 16 and the jaw member 26 as the tire 22 is lifted by the tire lifter apparatus 10 of the invention. As the first lever arm portion 14 is pulled up along the arc 41, the side of the tire 22 (which is in contact with the second lever arm portion 16, the first clamp member 24, and the jaw member 26 of the tire lifter apparatus 10) is lifted and pivots around the opposite side 43 of the tire 22 which stays on the ground or floor. When the arc 41 is 90 degrees, the tire 22 has been moved from a horizontal to a vertical orientation.

Once the tire 22 is in a vertical orientation, the weight of the tire 22 no longer causes the tire 22 to be clamped between the second lever arm portion 16 of the lever member 12 and the jaw member 26 of the clamp assembly 20. Therefore, the tire lifter apparatus 10 can be readily removed from the tire 22 when the tire 22 is in a vertical orientation.

If desired, the tire lifter apparatus 10 of the invention can also be used to lower a tire from a vertical orientation to a horizontal orientation.

The components of the tire lifter apparatus of the invention can be made from inexpensive and durable metal materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved tire lifter apparatus that is low in cost, relatively simple in design and operation, and which may advantageously be used to lift a tire from a horizontal to a vertical orientation. With the invention, a tire lifter apparatus is provided which can be readily hand-carried from one location to another. With the invention, a tire lifter apparatus is provided which can be used to lift and move tires without the use of hydraulic cylinders. With the invention, a tire lifter apparatus is provided which has only two moving parts. With the invention, a tire lifter apparatus is provided which is readily adjustable to different tires having different thicknesses. With the invention, a tire lifter apparatus is provided which automatically clamps onto a tire to be lifted. With the invention, a tire lifter apparatus is provided which is a hand-held, readily-carried tire lifter apparatus having two moving parts which employs the principle of leverage for lifting tires from a horizontal to a vertical orientation.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A tire lifter apparatus, comprising:

a lever member which includes a proximal end and a distal end, wherein said lever member includes a first lever arm portion adjacent to said proximal end and a second lever arm portion adjacent to said distal end, wherein said second lever arm portion lies within an apparatus plane, a fulcrum assembly connected to said lever member such that said fulcrum assembly divides said lever member into said first lever arm portion and said second lever arm portion, wherein said fulcrum assembly projects outward from a first side of said lever member, wherein said fulcrum assembly is within the apparatus plane, a clamp assembly pivotally connected to said fulcrum assembly, wherein said clamp assembly lies within the apparatus plane, and wherein said clamp assembly includes a first clamp member connected to said fulcrum assembly, wherein said first clamp member is oriented substantially perpendicular to said lever member in said apparatus plane when said clamp assembly is installed on a tire, and a jaw member connected at a perpendicular orientation to said first clamp member at a distal end of said first clamp member in said apparatus plane, wherein said jaw member extends from said first clamp member in a direction toward said distal end of said lever member, wherein said jaw member includes a pointed end adapted to grip a tire, such that said clamp assembly is adapted to clamp onto a tire which is within a tire plane, wherein said tire plane is perpendicular to said apparatus plane, a stop member connected to said first lever arm portion of said lever member adjacent to said fulcrum assembly and in contact with said first clamp member when said clamp assembly is in a vertical orientation, wherein said stop member is in said apparatus plane, and wherein said fulcrum assembly is connected to said lever member by a first connection, and said fulcrum assembly is connected to said clamp assembly by a second connection which is a pivotal connection.

2. The apparatus of claim 1, further including:

a handle grip connected to said first lever arm portion of said lever member.

3. The apparatus of claim 1, further including:

a protective cap placed over said distal end of said lever member.

* * * * *